US009921365B2

(12) United States Patent
Abe et al.

(10) Patent No.: US 9,921,365 B2
(45) Date of Patent: Mar. 20, 2018

(54) LIGHT-GUIDE-PLATE CREATION METHOD AND DEVICE

(71) Applicant: MUTOH INDUSTRIES LTD., Tokyo (JP)

(72) Inventors: Yoichi Abe, Tokyo (JP); Tomoo Nakajima, Tokyo (JP)

(73) Assignee: MUTOH INDUSTRIES LTD., Tokyo (JP)

( * ) Notice: Subject to any disclaimer, the term of this patent is extended or adjusted under 35 U.S.C. 154(b) by 675 days.

(21) Appl. No.: 14/387,320

(22) PCT Filed: Dec. 14, 2012

(86) PCT No.: PCT/JP2012/082525
§ 371 (c)(1),
(2) Date: Sep. 23, 2014

(87) PCT Pub. No.: WO2013/145463
PCT Pub. Date: Oct. 3, 2013

(65) Prior Publication Data
US 2015/0054186 A1    Feb. 26, 2015

(30) Foreign Application Priority Data

Mar. 30, 2012  (JP) ................................. 2012-078985

(51) Int. Cl.
*F21V 8/00*        (2006.01)
*B29C 41/02*       (2006.01)
(Continued)

(52) U.S. Cl.
CPC ............ *G02B 6/0065* (2013.01); *B29C 41/02* (2013.01); *B29D 11/00663* (2013.01);
(Continued)

(58) Field of Classification Search
CPC .. G02B 6/0065; G02B 6/0043; G02B 6/0058; B29C 41/02; B29D 11/00663
See application file for complete search history.

(56) References Cited

U.S. PATENT DOCUMENTS

2003/0210210 A1    11/2003 Ide et al.

FOREIGN PATENT DOCUMENTS

JP        9-68614      3/1997
JP        9-145937     6/1997
(Continued)

OTHER PUBLICATIONS

International Search Report dated Mar. 26, 2013 in International Application No. PCT/JP2012/082525.

*Primary Examiner* — Stella K Yi
(74) *Attorney, Agent, or Firm* — Wenderoth, Lind & Ponack, L.L.P.

(57) ABSTRACT

A light guide plate for a liquid crystal screen display apparatus providing a favorable visual effect. The printing data of a light reflection pattern stored in a computer is transferred to an inkjet printer to allow the inkjet printer to subject a substantially-rectangular printing face surrounded by upper and lower and left and right edges of a light guide plate to a reflective printing for diffusing light emitted from a light source into the interior of the light guide plate. The printing data for performing the reflective printing is prepared so that a printing density is increased from the edges in the four directions corresponding to the edges in the four directions of the light guide plate toward one or more high density setting points set in front of the respective opposed edges. The reflective printing is performed using white ink including titanium oxide.

3 Claims, 11 Drawing Sheets

(51) Int. Cl.
 B29D 11/00 (2006.01)
 B29K 509/00 (2006.01)
 B29L 11/00 (2006.01)

(52) U.S. Cl.
 CPC ... *B29K 2509/00* (2013.01); *B29L 2011/0075* (2013.01); *G02B 6/0043* (2013.01); *G02B 6/0061* (2013.01)

(56) References Cited

FOREIGN PATENT DOCUMENTS

| | | | |
|---|---|---|---|
| JP | 2001-93319 | | 4/2001 |
| JP | 2003-66208 | | 3/2003 |
| JP | 2007-25150 | | 2/2007 |
| JP | 2010-164745 | | 7/2010 |
| JP | 2010-186679 | | 8/2010 |
| JP | 2010-205417 | | 9/2010 |
| JP | 2010205417 | * | 9/2010 |
| WO | 2011/104765 | | 9/2011 |
| WO | 2012/015013 | | 2/2012 |

\* cited by examiner

FIG.2

| INK SUPPLY SECTION | INK KIND |
|---|---|
| A | WHITE INK A |
| B | WHITE INK B |
| C | WHITE INK C |
| D | WHITE INK D |

| Area | Luminance |
|---|---|
| a | 1000～1500 |
| b | 1500～2500 |
| c | 2500～3500 |
| d | 3500～4000 |
| e | 4500～ |

LIGHT-GUIDE-PLATE CREATION METHOD AND DEVICE

TECHNICAL FIELD

The present invention relates to a method and an apparatus for preparing a light guide plate used for a liquid crystal screen display apparatus for example.

BACKGROUND ART

It has been known to subject a transparent acrylic plate for example to the printing by an inkjet printer for example to operate the pixel density to prepare a light guide plate for uniform reflection. Another technique has been conventionally known to change a printing density for example by a distance from a peripheral section including a light source (e.g., LED) (see Patent Publication 1 for example).

In a screen printing, there is a disadvantage of available resolution, thus resulting in a known phenomenon of a visible dot pattern according to which a dot pattern is undesirably visible. In order to avoid this, it has been also suggested to use a light diffusion sheet for example and to provide a minute pitch for the elimination of the visible dot pattern (see Patent Publication 2 for example).

PRIOR ART PUBLICATION

Patent Publication

Patent Publication Japanese Laid-Open Publication No. H9-68614
Patent Publication 2: Japanese Laid-Open. Publication No. 2001-93319

SUMMARY OF THE INVENTION

Problem to be Solved by the Invention

In the case of current liquid crystal screen display apparatuses such as a liquid crystal television or a liquid crystal monitor, a thinner thickness has been one objective. Thus, such a light guide plate used therein has been required that prevents a visible dot pattern even when having a thinner thickness. Furthermore, there is another disadvantage that only uniform reflection from the light guide plate is not sufficient to achieve a favorable visual effect when a liquid crystal screen is seen by eyes.

From the viewpoint of brightness, a light guide plate having high brightness has been required.

It is an objective of the present invention to solve the above disadvantages.

Means for Solving the Problem

In order to solve the above disadvantages, the present invention provides a method of preparing a light guide plate, comprising: transferring printing data of a light reflection pattern stored in a computer to an inkjet printer to allow the inkjet printer to subject a substantially-rectangular printing face surrounded by upper and lower and left and right edges of a light guide plate to a reflective printing for diffusing light emitted from a light source into the interior of the light guide plate. This method is characterized in that the printing data for performing the reflective printing is set so that a printing density is increased from the edges in the four directions corresponding to the edges in the four directions of the light guide plate toward a high density setting point set in front of the respective opposed edges. The one or more high density setting points are provided to have a predetermined interval in a front-and-rear direction in front of one light source placement edge among the edges in the four directions of the printing data. The reflective printing is performed using white ink including titanium oxide.

The present invention is characterized in that when assuming that a distance between the light source placement edge and an opposing edge opposed to the edge is 1, the one high density setting point or the last high density setting point among the plurality of high density setting points that is closest to the opposing edge opposed to the light source placement edge is set at an arbitrary position for which a distance from the light source placement edge exceeds ½ and is smaller than 1 and is placed at a substantially-center position between the other remaining two edges.

The present invention is characterized in that the plurality of high density setting points are provided between the light source placement edge and the opposing edge opposed to the edge and each high density setting point is set to be substantially the center between the other two remaining edges.

The present invention provides an apparatus for preparing a light guide plate. This apparatus is composed of an inkjet printer and a computer for transferring printing data of a light reflection pattern to the printer. The printing data of the light reflection pattern stored in the computer is transferred to the inkjet printer. The inkjet printer subjects a printing face of a light guide plate to a reflective printing for diffusing the light emitted from a light source into the interior of the light guide plate using white ink including titanium oxide. The printing data for performing the reflective printing is set so that a printing density is increased from the edges in the four directions corresponding to the edges in the four directions of the light guide plate toward the high density setting point set in front of the respective opposed edges. The one or more high density setting points are provided to have a predetermined interval in a front-and-rear direction in front of one light source placement edge among the edges in the four directions of the printing data.

The present invention is characterized in that when assuming that a distance between the light source placement edge and an opposing edge opposed to the edge is 1, the one high density setting point or the last high density setting point among the plurality of high density setting points that is closest to the opposing edge opposed to the light source placement edge is set at an arbitrary position for which a distance from the light source placement edge exceeds ½ and is smaller than 1 and is placed at a substantially-center position between the other remaining two edges.

The present invention is characterized in that the plurality of high density setting points are provided between the light source placement edge and the opposing edge opposed to the edge and each high density setting point is set to be substantially the center between the other two remaining edges.

The present invention is characterized in that a printing data pattern having a density increasing from the edges in the four directions toward the high density setting point is formed by a gradation processing.

The present invention is characterized in that the printing data is prepared by referring to an ideal brightness distribution pattern required for the light guide plate.

The present invention is characterized in that the white ink includes titanium oxide in an amount of 10% or less.

The present invention is characterized in that the white ink is added with copper phthalocyanine.

The present invention is characterized in that the inkjet printer includes a white ink supply section in which a plurality of types of white inks that determine a color temperature of a light-emitting face of the light guide plate are respectively stored in ink tanks. The inkjet printer includes a plurality of printing heads. Each of the printing heads is connected to one of the ink tanks so that the respective printing heads can discharge different types of white inks. The inkjet printer forms the reflective printing on the light guide plate to prepare a light guide plate including a color temperature corresponding to selected one type of white ink or a combination of a plurality of types of white inks.

The present invention is characterized in that the respective plurality of types of white inks that determine the color temperature of the light-emitting face of the light guide plate include titanium oxide having different particle size distributions.

The present invention is characterized in that the respective plurality of types of white inks that determine the color temperature of the light-emitting face of the light guide plate include titanium oxide in different amounts.

Effect of the Invention

According to the present invention, such a light guide plate can be prepared for which the brightness close to the center is high when light is emitted from the periphery from a light source such as an LED. Thus, this light guide plate can be used for a liquid crystal screen display apparatus to thereby provide a favorable visual effect.

Furthermore, white ink using titanium oxide can be used to print a minute print by an inkjet method while changing a printing density, thereby providing a light guide plate free from a visible dot pattern. Furthermore, the use of the inkjet method can reduce the ink thickness, thus providing brighter surface emission by light of an optically-transparent part and a reflective part. By including a different amount of titanium oxide, the brightness can be changed in a minute manner. Furthermore, the existence of a plurality of high density setting points can provide a more minute adjustment of brightness distribution.

BRIEF DESCRIPTION OF THE DRAWINGS

FIG. 2 illustrates the present invention.

EMBODIMENT FOR CARRYING OUT THE INVENTION

The following section will describe in detail the configuration of the present invention with reference to the attached drawings.

Figure 1:
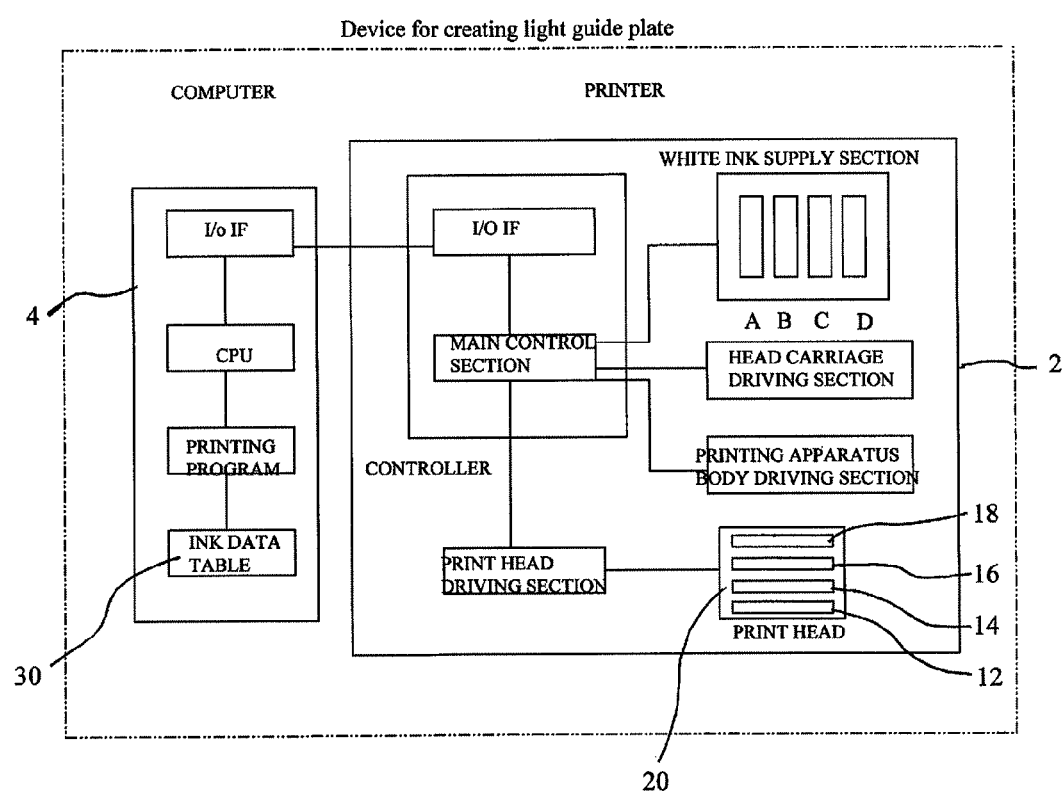
FIG. 1 is a block diagram illustrating the apparatus.
Figure 3:
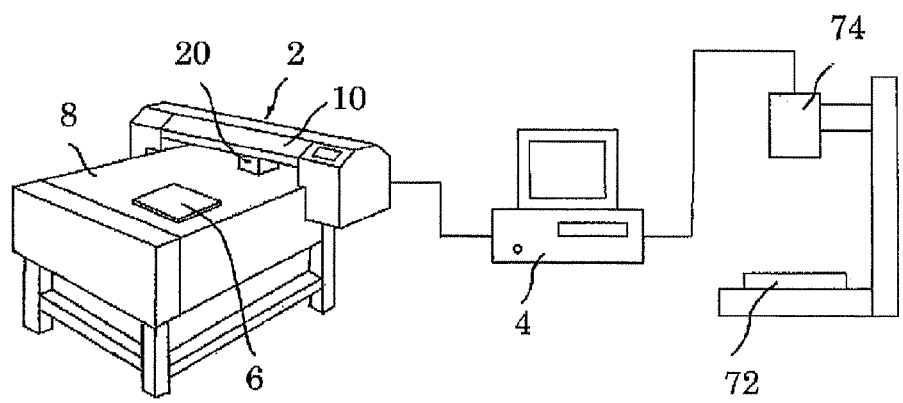
FIG. 3 illustrates the present invention.
Figure 5:
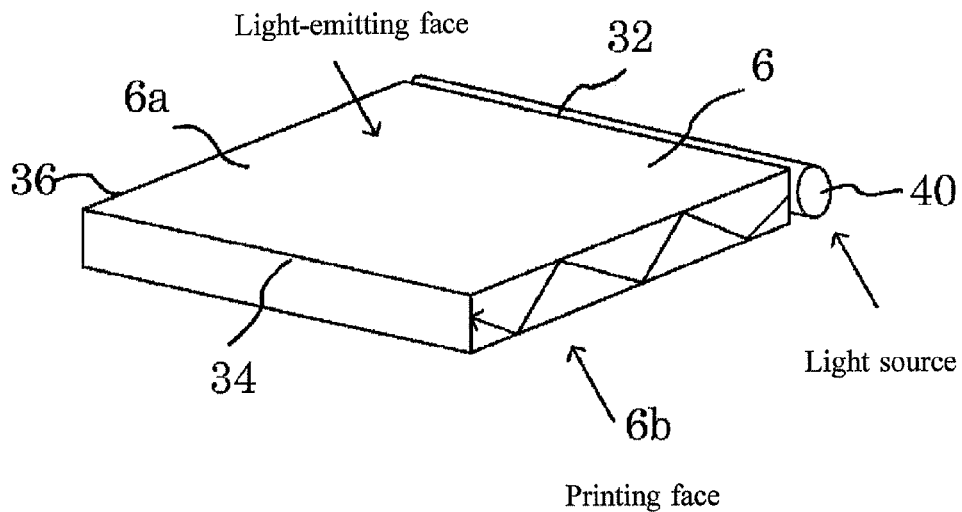
FIG. 5 illustrates a light guide plate.

FIG. 1 and FIG. 3 are a schematic view of a light guide plate printing apparatus composed of an inkjet printer 2 and a computer 4 (e.g., personal computer) connected to a controller of the printer 2 via an input/output interface. As shown in FIG. 5, a light guide plate 6 is detachably attached on a table 8 of the printing apparatus so that a printing face 6b at the back side of a light-emitting face 6a faces upward.

A printing (printing) to the light guide plate 6 is performed by the control by a printing apparatus body drive section so that while a horizontal rail 10 is fed based on a set printing unit in one direction (sub-scanning direction), a head carriage 20 including inkjet printing heads 12, 14, 16, and 18 is moved along this horizontal rail 10 by the control by a head carriage drive section in a main scanning direction orthogonal to the carrying direction of the horizontal rail 10. When the head carriage 20 is moved in the main scanning direction, ink is discharged from the nozzles of the printing heads 12 to 18. The printing data transferred from the computer 4 to the controller of the inkjet printer 2 is printed, based on the control by software stored in the controller, onto the printing face 6b of the light guide plate 6. It is noted that the term "printing" is used as having the same meaning as "printing".

Figure 4:
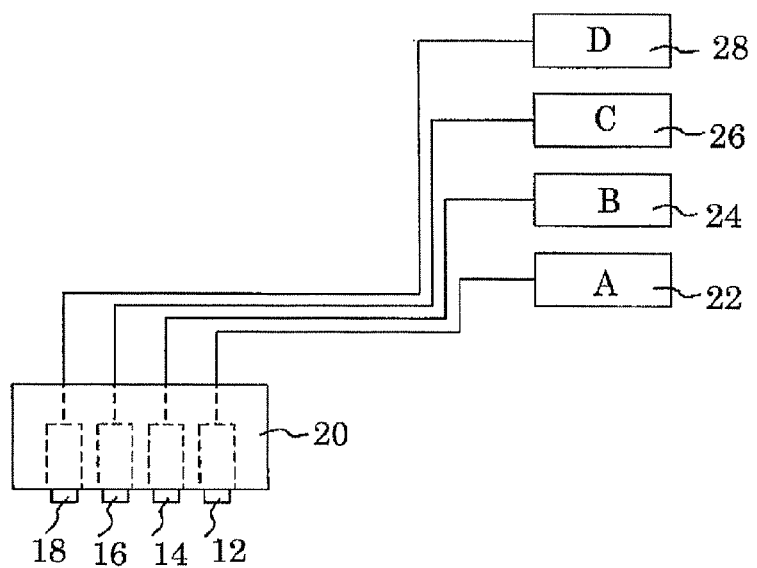
FIG. 4 illustrates the present invention.

The storage apparatus of the computer 4 stores therein a printing program for controlling the controller of the inkjet printer 2 to perform printing. The table 8 has thereon the horizontal rail 10 provided so as to be parallelly movable in the sub-scanning direction. The horizontal rail 10 is connected to the head carriage 20 so that the head carriage 20 is freely movable in the main scanning direction. This head carriage 20 retains, as shown in FIG. 4, a plurality of inkjet printing heads 12, 14, 16, and 18.

The respective printing heads 12, 14, 16, and 18 include many nozzles through which ink is discharged. As shown in FIG. 4, the respective printing heads 12, 14, 16, and 18 are respectively connected to corresponding ink tanks 22, 24, 26, and 28 of white ink supply sections A, B, C, and D including ink tanks provided in the body of the printer 2 via an ink supply means such as a tube. The plurality of printing heads 12, 14, 16, and 18 are parallelly arranged so that the respective printing regions are overlapped to one another in the main scanning direction along the lateral rail 10.

The storage apparatus of the computer 4 stores therein software (printing program) for preparing printing data of a light reflection pattern and includes an ink data table 30. This data table 30 includes combinations of color temperatures and inks A, B, C, and D set in advance so that a plurality of types of white inks A, B, C, and D can be printed on the light guide plate 6 individually or in a combination, thus providing the preparation of light guide plates having many types of color temperatures. The use of this data table 30 can provide an easy preparation of light guide plates having many types of color temperatures.

In FIG. 2, white inks A and B show two types of inks having different ink color temperatures with regard to the particle size of titanium oxide. The white ink C shows white ink including titanium oxide in an amount different from that of the white ink A. The white ink D shows white ink including titanium oxide in an amount different from that of the white ink B. In this embodiment, a plurality of types of white inks including titanium oxide in different particle size and amount are prepared, thus easily providing the printing at a plurality of color temperatures and the printing based on the combination thereof. White ink desirably includes titanium oxide in an amount of 10% or less. It has been experimentally confirmed that a reduced inclusion amount of titanium oxide can provide an easier control of the brightness change of the minute gradation on a light-emitting face of a light guide plate.

Figure 6:
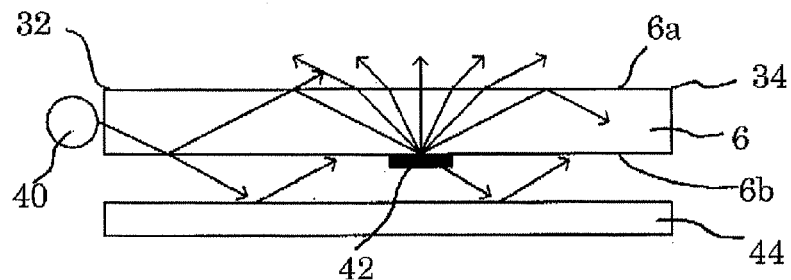
FIG. 6 illustrates a light guide plate.
Figure 7:
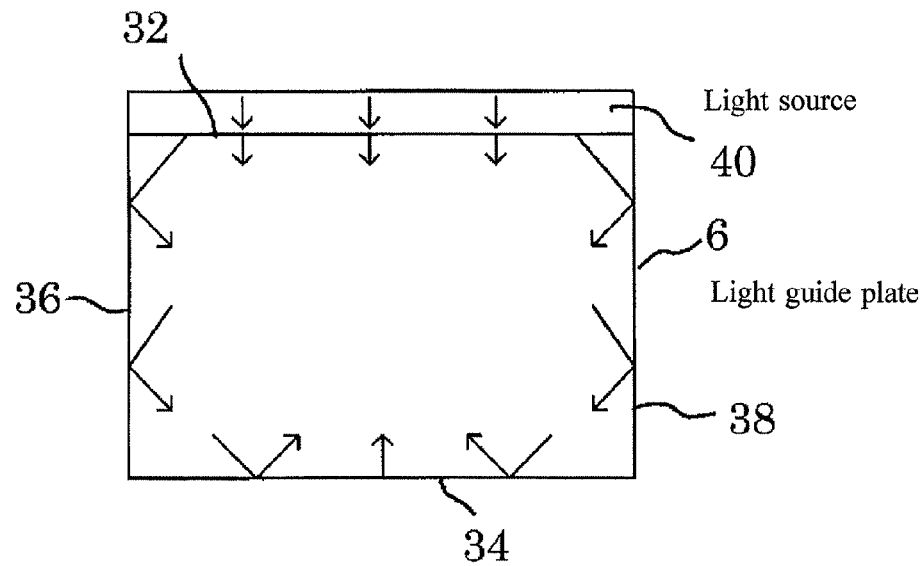
FIG. 7 illustrates a light guide plate.

A printing control printing program stored in the computer 4 is configured so as to be able to prepare or correct the ink data table 30 for example. The prepared light guide plate 6 is prepared by printing, on a flat surface part of the printing face 6b of the light guide plate (e.g., a transparent acrylic plate), reflective dots or reflective gradation (minute dots as in fogged glass). As shown in FIG. 5 to FIG. 7, by allowing the thickness part of an edge 32 of the upper part of the rectangular light guide plate 6 to include a light source 40 composed of a light-emitting material such as a cold-cathode tube or LED, the light-emitting face 6a can be viewed as if the entire flat surface emits light.

The light emitted from the light source 40 to the light guide plate 6 enters the interior through the edge 32 of the light guide plate 6. Then, as shown by the arrow, the light is reflected in the interior and is diffused in the entire light guide plate 6. The light includes the one passing to the upper side, the one passing through an ink 42, the one returning from a reflective plate 44, and the one reflected from edges 34, 36, and 38 of the light guide plate 6 for example and is diffused in the entire light guide plate 6. When ink using titanium oxide is used, white inks having different color temperatures are prepared based on the particle size distribution of titanium oxide in the ink to change a variation of the particle size distribution. Thus, different reflection light is generated to cause a difference in the color temperature. The reason is that titanium oxide in the ink having different particle sizes causes, after the printing, different intensities of diffused light depending on the light wavelength, thus resulting in a different color temperature of the diffused light of the printed light guide plate.

[Regarding White Ink and Color Temperature]

Figure 16:
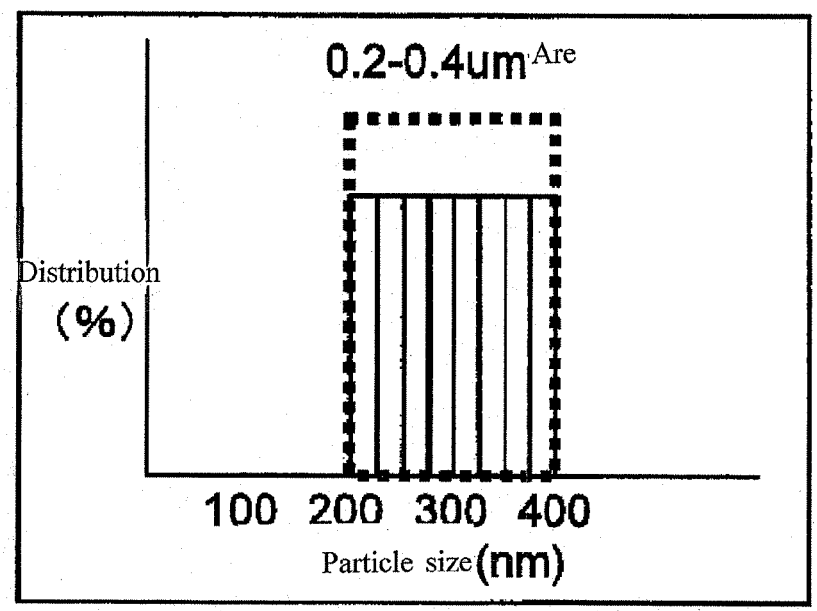
FIG. 16 illustrates the present invention.

White ink includes titanium oxide as ink pigment. Titanium oxide particles have a characteristic that light having a wavelength twice as the particle size is reflected most strongly. Ideal white ink includes titanium oxide having a uniform particle size distribution of 200 nm to 400 nm as shown in FIG. 16. In this case, the resultant white color uniformly reflects light of 400 nm to 800 nm (visible light) having a wavelength twice as that of the particle size of 200 nm to 400 nm.

However, it is rare for actual white ink to have a uniform particle size distribution of 200 nm to 400 nm, thus resulting in the followings.

(1) When white ink mainly includes a particle size of 200 nm (see FIG. 17), the white ink is bluish white ink that strongly reflects light of 400 nm (short wavelength) and that has a high color temperature.

(2) When white ink mainly includes a particle, size of 400 nm (see FIG. 18), the white ink is reddish, yellowish, or greenish white ink that strongly reflects light of 800 nm (long wavelength) and that has a low color temperature.

In the adjustment of a color temperature, a combination of these white inks having different color temperatures (or having different titanium oxide distributions) is used to prepare a light guide plate having a desired color temperature (i.e., a desired titanium oxide distribution=a desired light wavelength band). However, if the color temperature adjustment only based on the titanium oxide particle size is difficult, other particles such as copper phthalocyanine may be added to provide light having a desired wavelength band.

Figure 17:
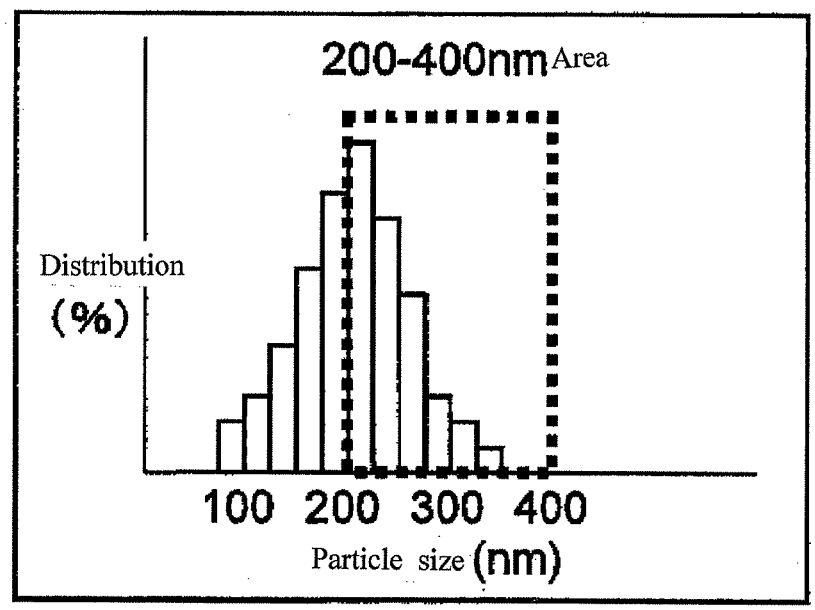
FIG. 17 illustrates the present invention.
Figure 18:
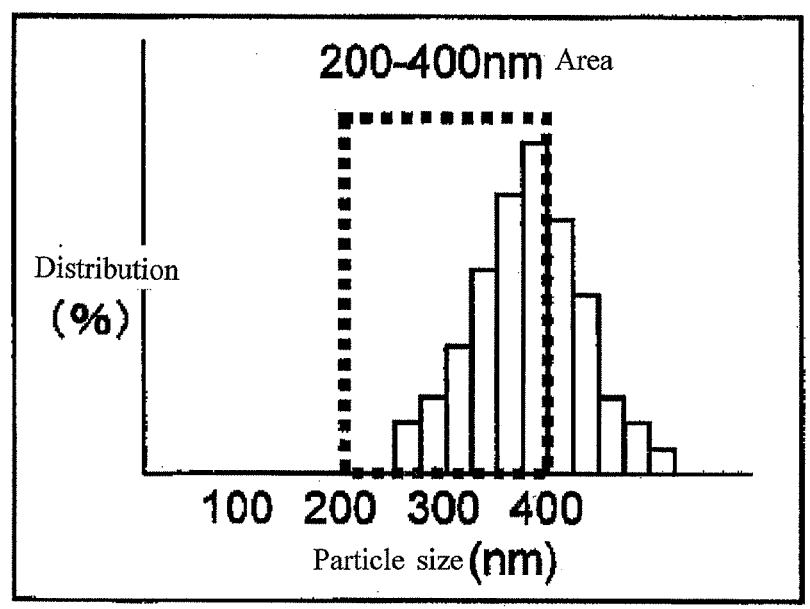
FIG. 18 illustrates the present invention.

FIG. 16 to FIG. 18 show an image diagram of the particle size distribution of titanium oxide in ink in which the horizontal axis represents a particle diameter while the vertical axis represents a distribution level. FIG. 16 illustrates the titanium oxide particle distribution in ideal white ink. FIG. 17 to FIG. 18 illustrate the titanium oxide particle distribution in actual white ink.

Ink used in this embodiment is added with a minute amount of copper phthalocyanine. An experiment result is obtained that experimentally selecting an appropriate addition amount can easily control the ink color temperature. In order to print the light guide plate 6, an operator can hit an ink selection button 48 displayed on a display 46 of the computer 4 by a mouse for example to thereby select white ink A, B, C, or D. Alternatively, a mixing button 50 can be operated to mix white inks in a desired combination. Furthermore, a plurality of inks A and B or A and C for example can be specified. Thus, the operator can specify which printing part uses what ink based on a correspondence to the prepared printing data.

Figure 10:
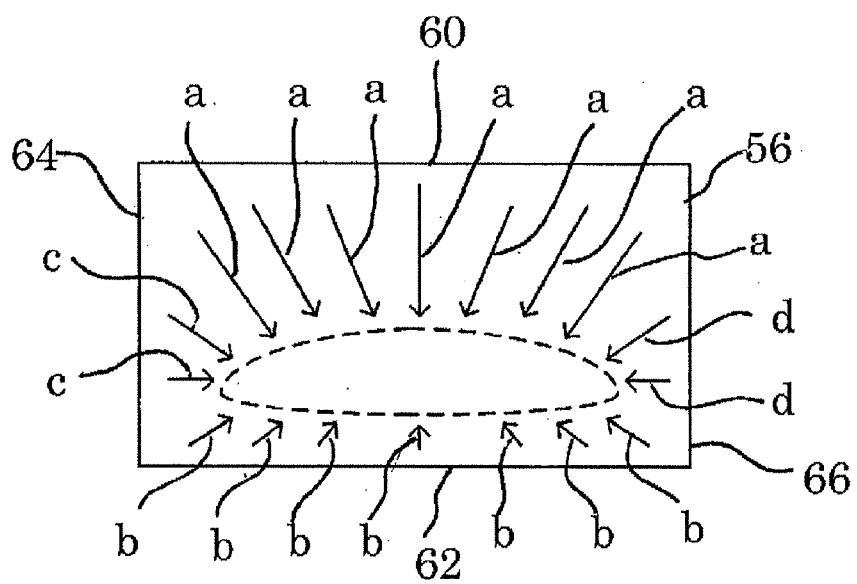
FIG. 10 illustrates the present invention.

FIG. 10 illustrates reflective face printing data 56 prepared on the computer using printing data preparation software for preparing a light guide plate reflective pattern. The printing data 56, which was generated within the rectangular region depending on the rectangular shape of the light guide plate, is formed so that the printing density (density) is increased toward the high density setting point set within the rectangular region. Since the reflective pattern of the light guide plate is printed, the entirety is printed in which the printing density gradation direction is shown. It is noted that FIG. 10 is an example and thus the shape for example is not particularly limited to this.

Figure 20:
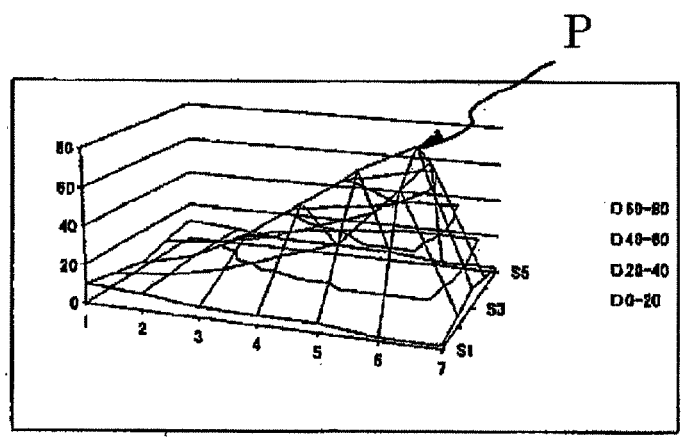
FIG. 20 illustrates the present invention.

FIG. 20 shows a specific image of the printing density of printing data 66 in a three-dimensional manner. In FIG. 20, P denotes a high density setting point. This high density setting point shows the highest density part. In this embodiment, one high density setting point is used. However, the invention is not particularly limited to one point. In FIG. 10, a certain space in four directions also may be used. In FIG. 20, the number 1 shows a light source direction. The numbers 1 to 7 show that the region between a light source side edge 60 of the printing data 56 and an opposing edge 62 opposed thereto is evenly divided to 7 sections. The numbers 0 to 80 along the vertical axis show a color density by %.

Furthermore, S1, S3, and S5 show the scale between left and right edges 64 and 66. In the vicinity of the lower center part within the rectangular region, the high density setting point P is set. This point has parts having a higher printing density. The reason is that apart farther away from the light source must have a higher reflectivity for example. However, since the other peripheries may be influenced by the reflection returning from an end (see FIG. 7), printing pattern data may be prepared in consideration of such a part.

Figure 11:
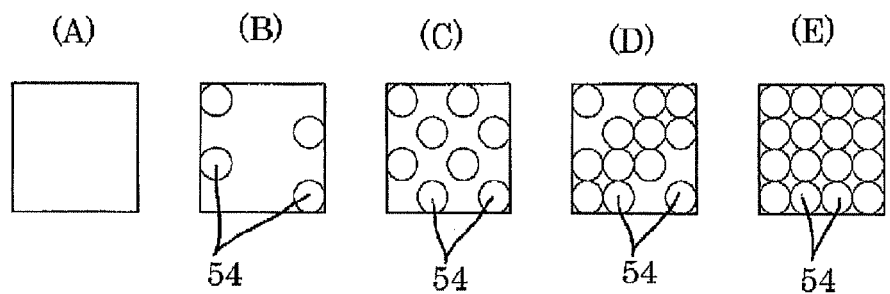
FIG. 11 illustrates the present invention.
Figure 12:
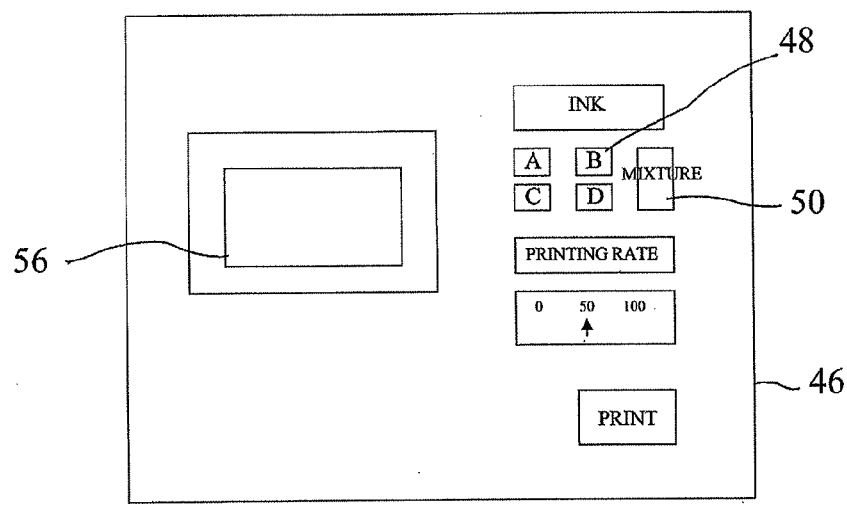
FIG. 12 illustrates the present invention.

The printing data 56 is prepared based on a gradation pattern. The term "gradation" means a printing density change pattern formed by the gradation pattern generation mode of the printing data preparation software. When the gradation pattern is drawn, the printing density can be changed in a range from 0% to 100%. FIG. 11 illustrates the density in the gradation pattern diagram. In FIG. 11, (A) shows 0% density, (B) shows 25% density, (C) shows 50% density, (D) shows 75% density, and (E) shows 100% density, respectively. It is noted that FIG. 11 is a simplified view and an actual printing is performed with many dots. Thus, a printing position is specified based on the printer resolution within which range the printing within an arbitrary range (e.g., 0 to 100%) is possible.

In the printing data 56, the first density change section is formed by changing the printing density from the low status to the highest status so as to form a gradation pattern from the light source placement edge 60 of the printing data 56 toward the high density setting point set in the printing region. The arrow a shows that in the first density change section, the density increases from the low status in the arrow direction (i.e., toward the high density setting point).

The second density change section is formed by changing the printing density from the low status to the highest status so as to form gradation from the edge 62 at an opposite side of the light source placement edge 60 within a relatively-narrow range toward the high density setting point of the printing region.

The arrow b shows that in the second density change section, the density increases from the low status in the arrow direction (i.e., toward the high density setting point). The printing density is similarly changed from the low status to the highest status so as to form a smooth gradation pattern from both of the left and right edges 64 and 66 within a relatively-narrow range toward the high density setting point of the printing region to form the third density change section and the fourth density change section. The arrow c shows that in the third density change section, the density increases from the low status in the arrow direction. The arrow d shows that in the fourth density change section, the density increases from the low status in the arrow direction.

Figure 19:
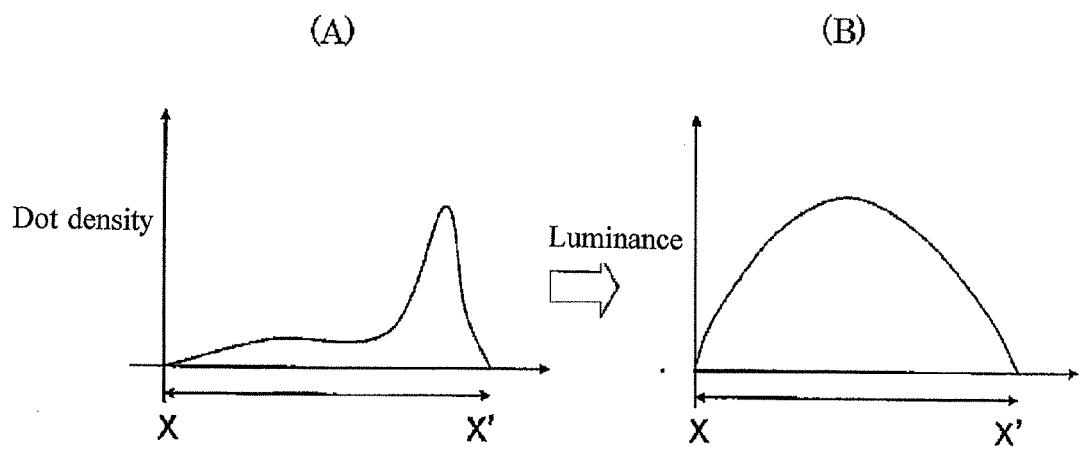
FIG. 19 illustrates the present invention.

The printing data 56 is designed based on an ideal brightness distribution pattern diagram of a light guide plate prepared in advance. FIG. 19 is a graph illustrating the relation between the dot density and the brightness in which X represents a light source direction and each horizontal axis represents a distance from the light source. The high density setting point is set at a substantially center between the left and right edges and when assuming that a distance between the light source placement edge 60 and the opposing edge 62 opposed to the edge is 1, at an arbitrary position for which a distance from the edge 60 exceeds ½ and is lower than 1 (i.e., a position in front of the edge 62). In this embodiment, when the distance is evenly divided to 7 parts, a high density peak is set at a position around $6/7$ of the distance from the edge 60. However, this position varies depending on the material of a light guide plate to be used, the thickness, the ink type, or the light source brightness for example.

When the light guide plate has a reduced thickness for example, a favorable result is obtained when this position is moved toward the center by setting at ¼ or ⅓ for example from the edge 62. A magnitude at which the printing density is changed also may be changed depending on conditions. In this case, the printing density is changed toward a tip end of the high density part (i.e., the high density setting point P). However, this part does not always have to be a tip end as shown in FIG. 20 and may be changed toward a flat region having a certain level or more.

Figure 13:
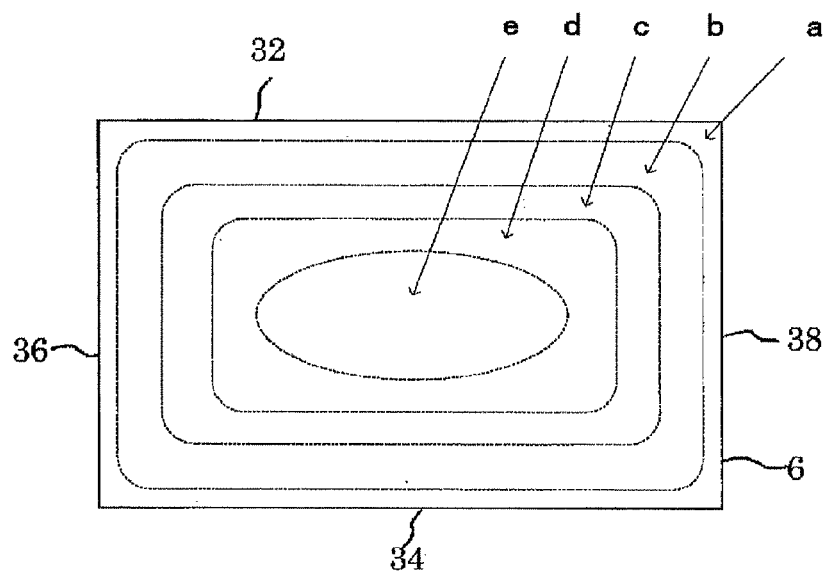
FIG. 13 illustrates the present invention.

In the case of a printing in which light sources are provided at the upper and lower edges 60 and 62, the high density setting point is desirably set, when assuming that a distance between the edge 60 and the edge 62 at an opposite side is 1, at a distance substantially ½ from the edge 62 and at a substantially center between the left and right edges. An ideal brightness distribution pattern diagram is displayed by showing the brightness by colors. FIG. 13 illustrates a brightness distribution pattern diagram of the light guide plate in this embodiment that is substantially the same as an ideal brightness distribution pattern diagram used as a reference.

In the light-emitting face 6a of the light guide plate 6, the area a has the brightness of 1000 to 1500 (unit: candela/square meter, the same applies hereinafter), the area b has the brightness of 1500 to 2500, the area c has the brightness of 2500 to 3500, the area d has the brightness of 3500 to 4000, and the area e has the brightness of 4500 or more.

Figure 8:
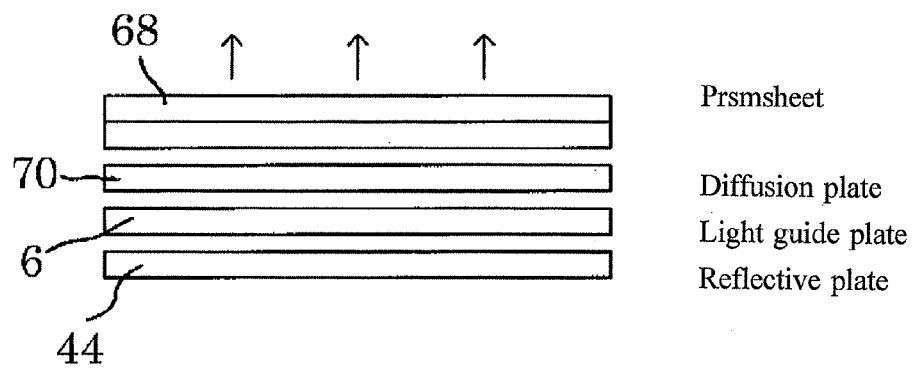
FIG. 8 illustrates a part of a liquid crystal screen display apparatus.

When the light guide plate 6 including the ideal brightness distribution pattern shown in FIG. 13 is used, as shown in FIG. 8, for a liquid crystal display apparatus (e.g., liquid crystal television or a liquid crystal monitor) including a prism sheet 68, a diffusion plate 70, and a reflective plate 44, then an optimal surface emission apparatus suitable for human vision can be obtained for which the brightness close to the center is high and the brightness is slightly reduced toward an end. When the reflection printing data 56 prepared by software is printed on the light guide plate 6, the operator selects the type of ink to be used or the ink mixing conditions to input them to the computer 4 and clicks a printing button.

Figures 14, 15:
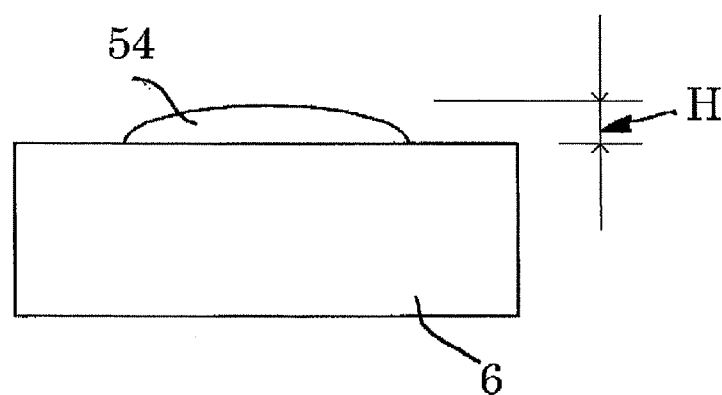
FIG. 14 illustrates the present invention.
FIG. 15 illustrates the present invention.

As a result, the printing data is transferred from the computer 4 to the printer 2. Thereafter, the printer 2 processes the data. Then, the horizontal rail 10 is carried based on a set printing width unit in the sub-scanning direction. The head carriage 20 is driven in the main scanning direction and the light guide plate 6 is subjected to printing by white ink having the selected printing conditions. In this embodiment, as shown in FIG. 15, the ink dot 54 has the thickness H set to 0.5 μm that is much thinner than in the case of the screen printing (about 100 μm).

As a result, light reflected from the white ink dots and light passing through the ink and reflected from a reflective plate 72 can provide a synergy effect to provide the light guide plate 6 brighter than the conventional design. White ink used for printing includes an adjusted amount of titanium oxide in order to easily control the brightness based on a minute gradation printing. By including a different amount of titanium oxide, a reflection amount can be changed. Thus, a minute change can be incorporated to thereby easily control the light reflection amount or a diffusion amount.

In order to provide the minute control, white ink desirably includes titanium oxide in an amount of 10% or less. Furthermore, in order to provide a further minute control in this case, white ink including titanium oxide in an amount of about 1% is also prepared. Individual white inks or a plurality of white inks can be combined to control the brightness based on the printing with a minute gradation.

Furthermore, in the case of an inkjet printer in which a plurality of ink discharge printing waveforms or drive voltages are used to control the ink discharge amount to change the ink dot diameter, a plurality of resolutions can be used. Thus, by performing printing by a dot diameter of about 25 μm required for the resolution of 1440 dpi, the brightness control based on a minute gradation can be easily provided. Furthermore, by performing printing by a dot diameter of about 100 μm required for the resolution of 360 dpi, the printing speed can be increased.

Furthermore, a dot diameter of about 50 μm required for 720 dpi also may be used for printing. In an actual printing, printing is performed while the head is moving. Thus, the ink dot diameter has an elliptic shape. Thus, such an ink dot diameter can be used that can fill a narrow width direction in the resolution used. If the resolution cannot be filled, a plurality of dot diameters may be combined for printing.

When the printing to the light guide plate 6 is completed, the printed light guide plate 6 is attached to an LED lighting stand 72 shown in FIG. 3. Then, the LED is lit and a camera 74 is used to photograph the light-emitting face of the light guide plate 6 to measure the brightness distribution of the light-emitting face.

The brightness data measured by the camera 74 (in which the brightness is displayed by colors) is used as a brightness distribution pattern diagram and is displayed on the screen of the computer 4 or is printed out. Then, the diagram is compared with an ideal brightness distribution pattern diagram used as a reference. If the light guide plate 6 has the brightness distribution that is the same as or close to the ideal brightness distribution pattern, the printing data preparation work on the computer is completed. If the result is not satisfactory, the printing data is corrected and this operation is repeated until the ideal brightness distribution pattern is obtained. For example, if a part having high brightness in FIG. 13 is slightly dislocated in the lower direction, the printing density of the printing data of the corresponding part in the printing data shown in FIG. 10 is changed or the position of a part having a high printing density is corrected to a slightly-higher position. Alternatively, the type of ink used at the position or the to-be-used ink dot diameter also may be changed.

Figure 21:
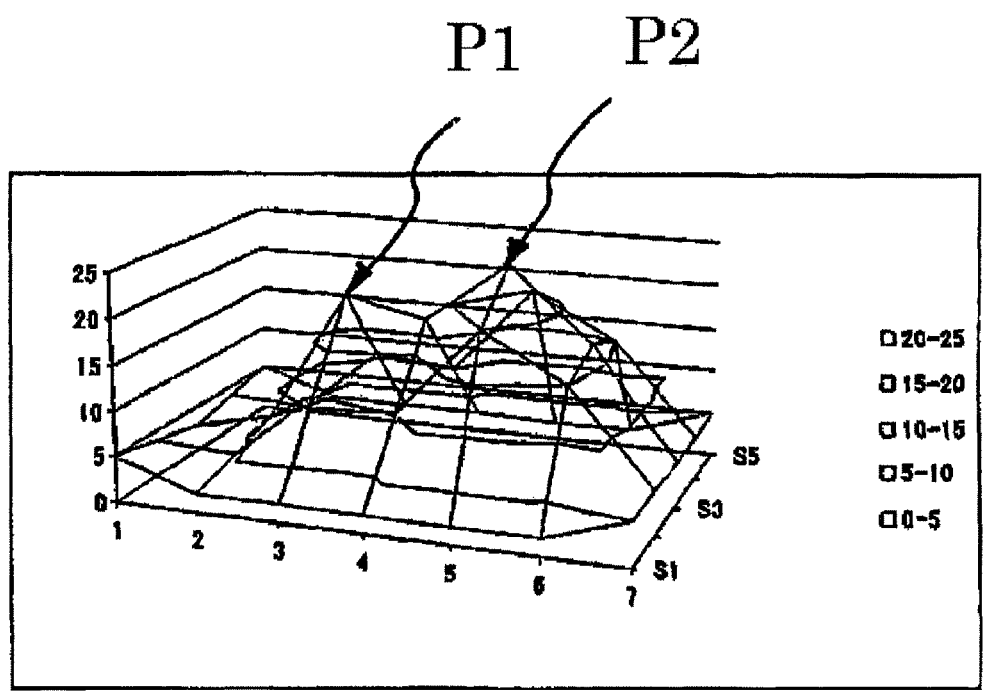
FIG. 21 illustrates another embodiment of the present invention.

FIG. 21 is a three-dimensional view illustrating an embodiment in which two high density setting points are provided. The printing data 56, which is generated in the rectangular region depending on a rectangular shape of the light guide plate, is formed so that the printing density (density) is increased toward the respective high density setting points P1 and P2 set in the rectangular region. Since the reflective pattern of the light guide plate is printed, the entirety is printed in which the direction of the printing density gradation is shown. FIG. 21 illustrates an example of the two high density setting points. Thus, the shape for example is not particularly limited to this.

The high density setting point shows the highest density part relative to the front and rear density parts. In this embodiment, one high density setting point is provided in the left-and-right direction. However, the invention is not particularly limited to one point. In FIG. 21, the high density setting points also may be provided to have a certain level of extension (space) in four directions. In FIG. 21, the number 1 shows the light source direction and the numbers 1 to 7 show spaces obtained by equally dividing the space between the light source placement edge 60 of the printing data 56 and the opposing edge 62 opposed thereto into 7 spaces for which the light source placement edge 60 side is defined as a front side. Furthermore, S1, S3, and S5 show the scales between the left and right edges 64 and 66. The numbers 0 to 25 along the vertical axis show the color density by %.

In the vicinity of the center of the rear part of the rectangular region, the high density setting point P2 is set. In the vicinity of the center of the front part, the high density setting point P1 is set. The points P1 and P2 are set to have a lower density peak when compared to the embodiment of FIG. 20 in which only one point is provided. Thus, to increase the entire reflection, two points are set and the point 1 is provided in front of the point P2. In carrying out the present invention, a principle similar to the above embodiment can be used to further increase the number of the high density setting points. In a normal case, the upper limit of the high density setting points is about 5.

In this embodiment, the printing data is set so that the printing density is increased from the edges in the four directions corresponding to the edges in the four directions of the light guide plate toward the high density setting point positioned in front of the respective edges opposed thereto. The plurality of high density setting points are positioned in front of one light source placement edge among the edges in the four directions of the printing data and are provided to have a predetermined interval thereamong in the front-and-rear direction.

In the printing data, the density change section is formed by changing the printing density from the low status to the high status so as to form a gradation pattern from the light source placement edge 60 of the printing data toward the high density setting point P1. The high density setting points P1 and P2 are formed to show a density change having a valley-like shape. The printing data 56 is set so that the high density setting point P2 closest to the edge 62 at an opposite side of the light source placement edge 60 is set at substantially the center of the left and right edges and, when assuming that a distance between the light source placement edge 60 and the opposing edge 62 opposed to the edge is 1, at an arbitrary position for which a distance from the edge 60 exceeds ½ and is lower than 1 (i.e. a position in front of the edge 62). In this embodiment, when the distance between the light source placement edge 60 and the opposing edge 62 is equally divided to 7 spaces, the high density has a peak at a position of about 5/7 from the edge 60. However, this position varies depending on the material of the light guide plate to be used, the thickness, the ink type, or the brightness of the light source for example.

Also in this embodiment, the printing density is changed toward the tip end of the high density part (i.e., the high density setting points P1 and P2). However, the part does not always have to be a tip end as shown in FIG. 21 and also may be changed toward a flat region of a certain level or more.

In the above embodiment in which a minute printing is provided by white ink using titanium oxide based on an inkjet method while changing the printing density, a light guide plate can be provided that is free from a so-called visible dot pattern. Furthermore, the use of the inkjet method can reduce the ink thickness, thus providing brighter surface emission by light of an optically-transparent part and a reflective part. By preparing a plurality of white inks having different color temperatures, an easy printing based on a plurality of color temperatures can be provided. Furthermore, since the printing based on a combination also can be provided, thus providing a minute control of the color temperature.

If titanium oxide is included in a small amount, a minute change of the light reflection amount can be easily controlled. Alternatively, a plurality of white inks including different amounts of titanium oxide also may be used. Alternatively, when the printing is performed using a small dot diameter, a further minute control can be provided.

When the light guide plate prepared by this apparatus is used for a liquid crystal display apparatus for example, a diffusion plate for example also can be eliminated if the conditions of a user are met. Thus, the reduced structure also can provide a thinner thickness. Furthermore, the number of components also can be reduced from the viewpoint of cost.

Figure 9:
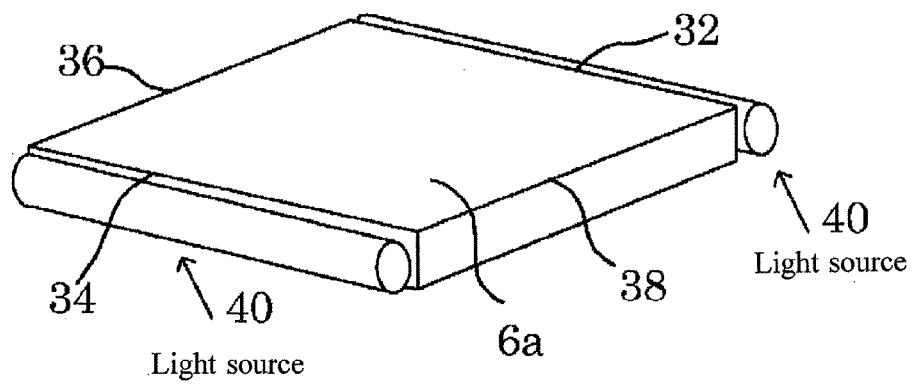
FIG. 9 illustrates a light guide plate.

In the above embodiment, the light source 40 is provided at one edge 32 of the light guide plate 6. However, as shown in FIG. 9, the light sources 40 also may be provided at both edges 32 and 34. Thus, the invention is not particularly limited to the provision of one light source. When both ends have light sources, the brightness distribution also changes. Thus, a printing pattern adjusted for such a configuration is required. For the data, a part having a high printing density moves in the center direction. Even when light sources have varied brightness, the variation can be adjusted by the correction based on the printing pattern to provide a desired brightness distribution. Thus, the difference in the light source at both ends can be accommodated.

Furthermore, in the above embodiment, the color temperature of the light guide plate is adjusted by preparing a plurality of types of white inks having different titanium oxide distributions to use these white inks in a combination. However, the invention is not particularly limited to this embodiment. Thus, the printer also may include only one type of white ink and the titanium oxide distribution status in the ink is adjusted in advance to a desired distribution status. Then, this adjusted white ink can be used to print a light guide plate.

Furthermore, another configuration may be used in which the printer includes only one type of white ink and the titanium oxide distribution status in the ink is adjusted in advance to a desired distribution status. Then, a plurality of printers are prepared which use this adjusted white ink to print a light guide plate. Then, a different type of white ink can be used for each printer so that one white ink is selected from thereamong if required to prepare a light guide plate having a desired color temperature.

Although the above description has been made for illustration with regard to an apparatus in which a medium is fixed and an inkjet head is moved. However, the invention is, not limited to this. Any configuration may be used so long as an inkjet printing can be carried out, including the one in which the medium is moved to perform printing or the line head is used to perform printing.

Furthermore, since an inkjet printer can use a plurality of resolutions depending on the specification of a product (e.g., a required printing mode such as 180 to 1440 dpi is selected and used), the resolution may be selected as required.

DESCRIPTION OF REFERENCE NUMERALS

2 Inkjet printer
4 Computer
6 Light guide plate
6a Light-emitting face
6b Printing face
8 Table
10 Horizontal rail
12 Printing head
14 Printing head
16 Printing head
18 Printing head
20 Head carriage
22 Ink tank
24 Ink tank
26 Ink tank
28 Ink tank
30 Ink data table
32 Edge
34 Edge
36 Edge
38 Edge
40 Light source
42 Ink
44 Reflective plate
46 Display
48 Ink selection button
50 Mixing button
52 Printing rate button
54 Ink dot
56 Printing data
60 Edge
62 Edge
64 Edge
66 Edge
68. Prism sheet
70 Diffusion plate
72 LED lighting stand
74 Camera

What is claimed is:

1. A method of preparing a light guide plate, comprising:
transferring printing data of a light reflection pattern stored in a computer to an inkjet printer to allow the inkjet printer to subject a substantially-rectangular printing face surrounded by upper and lower and left and right edges of a light guide plate to a reflective printing for diffusing light emitted from a light source into an interior of the light guide plate, wherein:
the printing data for performing the reflective printing is set so that a printing density is increased from edges in four directions corresponding to the edges in the four directions of the light guide plate toward high density setting points set in front of the respective opposed edges corresponding to the edges in the four directions of the light guide plate,
the high density setting points are provided to have a predetermined interval in a front-and-rear direction in front of and in the vicinity of the center of one light source placement edge among the edges in the four directions of the printing data, the printing density between the high density setting points are set to have a density changing in a valley-like manner, and
the reflective printing is performed using white ink including titanium oxide.

2. The light guide plate preparation method according to claim 1, wherein
when assuming that a distance between the light source placement edge and an opposing edge opposed to the light source placement edge is 1, the last high density setting point among a plurality of high density setting points that is closest to an opposing edge opposed to the light source placement edge is set at an arbitrary position for which a distance from the light source placement edge exceeds ½ and is smaller than 1 with respect to the distance between the light source placement edge and the opposing edge opposed to the light source placement edge and is placed at a substantially-center position between the other remaining two edges among the edges in the four directions of the printing data.

3. The light guide plate preparation method according to claim 1, wherein
a plurality of high density setting points are provided between the light source placement edge and an opposing edge opposed to the light source placement edge, and each high density setting point is set to be substantially a center between the other two remaining edges among the edges in the four directions of the printing data.

* * * * *